(12) United States Patent
Schoonmaker et al.

(10) Patent No.: US 8,948,940 B2
(45) Date of Patent: Feb. 3, 2015

(54) METHOD AND SYSTEM FOR CONTROLLING ENERGY DEMAND OF VEHICLES ON A NETWORK

(71) Applicant: General Electric Company, Schenectady, NY (US)

(72) Inventors: William Cherrick Schoonmaker, Melbourne, FL (US); David Allen Eldredge, Melbourne, FL (US); Vinaykanth Venkatasubba Mudiam, Lawrence Park, PA (US); Jared Klineman Cooper, Melbourne, FL (US)

(73) Assignee: General Electric Company, Schenectady, NY (US)

( * ) Notice: Subject to any disclaimer, the term of this patent is extended or adjusted under 35 U.S.C. 154(b) by 0 days.

(21) Appl. No.: 14/148,833

(22) Filed: Jan. 7, 2014

(65) Prior Publication Data

US 2014/0330460 A1 Nov. 6, 2014

Related U.S. Application Data

(60) Provisional application No. 61/819,823, filed on May 6, 2013.

(51) Int. Cl.
*G05D 1/00* (2006.01)
*B61C 17/12* (2006.01)
*B60L 9/00* (2006.01)

(52) U.S. Cl.
CPC .. *B61C 17/12* (2013.01); *B60L 9/00* (2013.01)
USPC .......................................................... 701/19

(58) Field of Classification Search
None
See application file for complete search history.

(56) References Cited

U.S. PATENT DOCUMENTS

| 8,280,567 | B2 | 10/2012 | Brand et al. | |
| 8,370,006 | B2 | 2/2013 | Kumar et al. | |
| 8,406,943 | B2 | 3/2013 | Brand et al. | |
| 8,473,127 | B2 | 6/2013 | Daum et al. | |
| 2010/0023190 | A1 | 1/2010 | Kumar et al. | |
| 2011/0298422 | A1* | 12/2011 | Failing | 320/109 |
| 2011/0302078 | A1* | 12/2011 | Failing | 705/39 |
| 2012/0296545 | A1 | 11/2012 | Cooper et al. | |
| 2012/0316717 | A1* | 12/2012 | Daum et al. | 701/22 |

\* cited by examiner

*Primary Examiner* — Thomas Tarcza
*Assistant Examiner* — Adam Alharbi
(74) *Attorney, Agent, or Firm* — GE Global Patent Operation; John A. Kramer

(57) ABSTRACT

A method includes monitoring an available amount of electrical energy on an electrical power grid for powering one or more loads at one time. The available amount of electrical energy represents an amount of electrical energy that may be consumed at one time without exceeding a grid capacity. The method also includes monitoring an electrical energy demand of plural electric vehicles traveling on a network of routes that includes one or more conductive pathways extending along the routes for delivering the electrical energy from the electrical power grid to the electric vehicles. The method further includes controlling movements of the electric vehicles such that the electrical energy demand of the electric vehicles does not exceed the available amount of electrical energy on the electrical power grid.

17 Claims, 7 Drawing Sheets

METHOD AND SYSTEM FOR CONTROLLING ENERGY DEMAND OF VEHICLES ON A NETWORK

CROSS-REFERENCE TO RELATED APPLICATIONS

This application claims priority to U.S. Provisional Application No. 61/819,823, which was filed on 6 May 2013, and is entitled "Method And System For Controlling Energy Demand Of Vehicles On A Network" (the "'823 Application"). The entire disclosure of the '823 Application is incorporated by reference.

FIELD

Embodiments of the subject matter described herein relate to electrically powered vehicle systems. Other embodiments relate to electrically powered vehicle systems traveling on a network of routes.

BACKGROUND

Known vehicle systems include one or more propulsion-generating vehicles or units and, in certain cases, one or more non-propulsion-generating vehicles or units, connected with each other to travel along a route. The propulsion-generating vehicles supply tractive force to propel the propulsion-generating vehicles and non-propulsion-generating vehicles along the route.

The propulsion-generating vehicles may be powered by electric current supplied to the vehicles from an off-board source via one or more conductive pathways that extend along the route being traveled. For example, the route (or at least a section thereof) may include a conductive pathway that is part of the route or that extends along the route and that supplies electric current to the propulsion-generating vehicles to power these vehicles. Such a conductive pathway may include an electrified rail, an overhead catenary, and the like.

The tractive force required to propel the propulsion-generating vehicles and non-propulsion-generating vehicles along the route may vary during a trip due to various parameters that change with position and/or time during the trip. These changing parameters may include the curvature and/or grade of the route, speed limits and/or requirements of the vehicle system, and the like. For electric propulsion-generating vehicles that are powered from electrical energy (e.g., electric current) from a section of an electrical route powered by an electrical power grid, the amount of electric energy that is demanded (e.g., drawn) by the electric propulsion-generating vehicles changes as the required tractive effort changes.

Presently, the overall number of electric propulsion-generating vehicles that can be operated on a section of a route that supplies electric energy to these propulsion-generating vehicles is limited by the capacity of the source of the electric energy. Several electric propulsion-generating vehicles demanding electric energy from the same source or bank of sources at the same time, for example, may demand a combined amount of electric energy that exceeds or risks exceeding the capacity of the source. Exceeding this capacity can result in insufficient electric energy being supplied to one or more of the propulsion-generating vehicles and, as a result, stall one or more vehicles. Such stalls can cause transportation delays.

In addition, other loads external to the vehicles may demand electric energy from the same source that also powers the propulsion-generating vehicles. For example, cities, towns, and the like may have many electric loads that are powered by electric energy from the same source that also powers the propulsion-generating vehicles. If the capacity of the source is exceeded by energy draw from the propulsion-generating vehicles and the other loads, insufficient electrical energy may be available for the other loads, which can lead to power outages.

One potential solution to the above problems is to increase the capacity of the source, increase the capacity of the conductive pathways that supply the electric energy, and/or increase the number of sources of electric energy. These solutions, however, involve significant financial costs and may be prohibitively expensive.

BRIEF DESCRIPTION

In an embodiment, a method (e.g., for controlling energy demand of plural propulsion-generating vehicles on a network) is provided that includes monitoring an available amount of electrical energy on an electrical power grid for powering one or more loads at one time. The available amount of electrical energy represents an amount of electrical energy that may be consumed at one time without exceeding a grid capacity. The method also includes monitoring an electrical energy demand of plural electric vehicles traveling on a network of routes that includes one or more conductive pathways extending along the routes for delivering the electrical energy from the electrical power grid to the electric vehicles. The method further includes controlling movements of the electric vehicles such that the electrical energy demand of the electric vehicles does not exceed the available amount of electrical energy on the electrical power grid.

In an embodiment, a network planner system is provided that includes a grid monitoring device and one or more processors. The grid monitoring device is configured to monitor an available amount of electrical energy on an electrical power grid for powering one or more loads at one time. The available amount of electrical energy represents an amount of electrical energy that may be consumed at one time without exceeding a grid capacity. The electrical power grid is configured to transmit electrical energy through one or more conductive pathways extending along a network of routes over which plural electric vehicles travel for delivery to the electric vehicles to power the electric vehicles. The one or more processors are configured to communicate with the grid monitoring device and the trip planner systems on the electric vehicles to control movements of the electric vehicles such that an electrical energy demand of the electric vehicles does not exceed the available amount of electrical energy on the electrical power grid.

In an embodiment, a network planner system is provided that includes a grid monitoring device, an energy demand monitoring device, and one or more processors. The grid monitoring device is configured to monitor an available amount of electrical energy on an electrical power grid for powering one or more loads at one time. The available amount of electrical energy represents an amount of electrical energy that may be consumed at one time without exceeding a grid capacity. The energy demand monitoring device is configured to monitor an electrical energy demand of plural electric vehicles traveling on a network of routes that includes one or more conductive pathways extending along the routes for delivering the electrical energy from the electrical power grid to the electric vehicles to power the electric vehicles. The one or more processors are configured to control movements of the electric vehicles such that the electrical energy demand of the electric vehicles does not exceed the available amount of electrical energy on the electrical power grid. The one or more processors are configured to control the movements of the electric vehicles by at least one of modifying energy usage plans submitted by the electric vehicles traveling on the network or communicating to the electric vehicles vehicle-specific maximum amounts of electrical energy that can be demanded from the electrical power grid by the respective electric vehicles.

BRIEF DESCRIPTION OF THE DRAWINGS

The subject matter described herein will be better understood from reading the following description of non-limiting embodiments, with reference to the attached drawings, wherein below.

DETAILED DESCRIPTION

Figure 1:
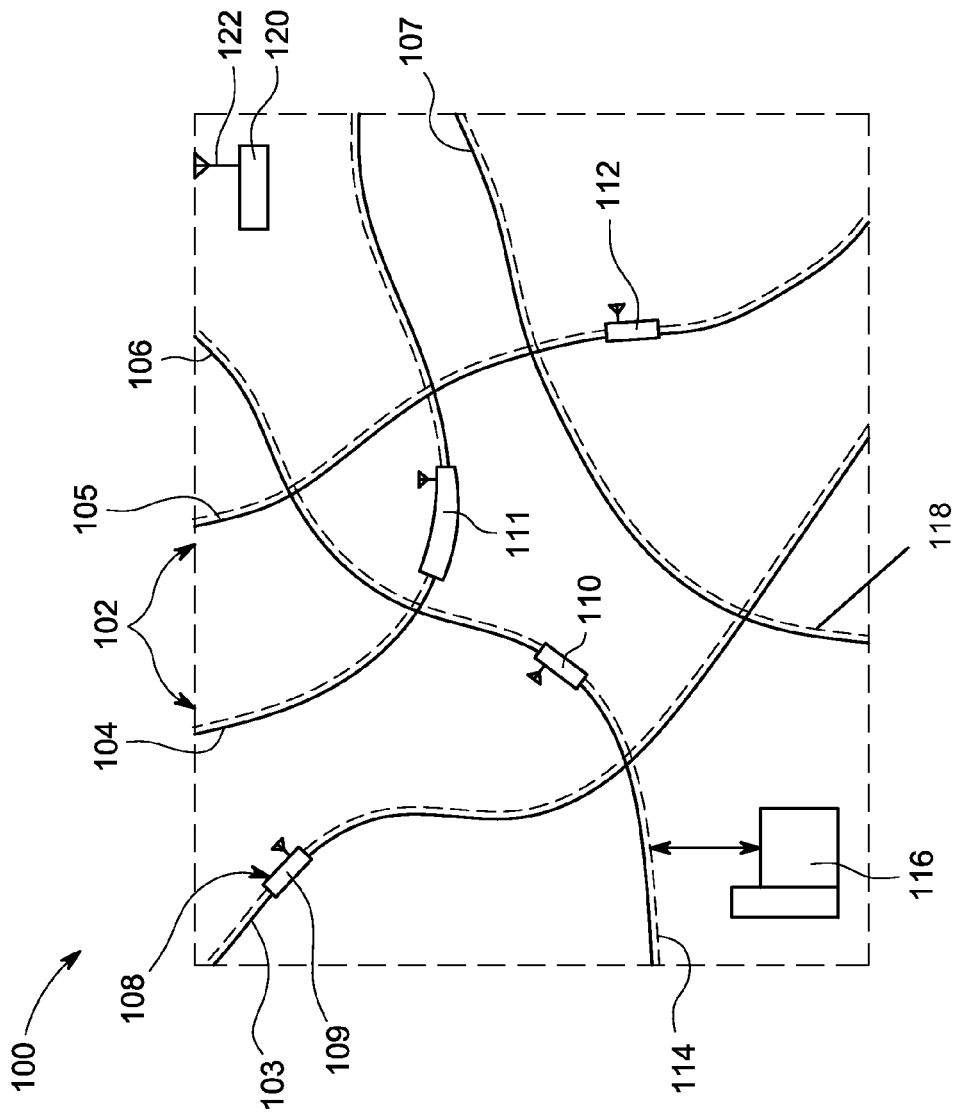
FIG. 1 is a schematic illustration of a vehicle network in accordance with an embodiment.

The foregoing summary, as well as the following detailed description of certain embodiments of the inventive subject matter, will be better understood when read in conjunction with the appended drawings. To the extent that the figures illustrate diagrams of the functional blocks of various embodiments, the functional blocks are not necessarily indicative of the division between hardware and/or circuitry. Thus, for example, one or more of the functional blocks (for example, processors or memories) may be implemented in a single piece of hardware (for example, a general purpose signal processor, microcontroller, random access memory, hard disk, and the like). Similarly, the programs may be standalone programs, may be incorporated as subroutines in an operating system, may be functions in an installed software package, and the like. The various embodiments are not limited to the arrangements and instrumentality shown in the drawings.

As used herein, an element or step recited in the singular and proceeded with the word "a" or "an" should be understood as not excluding plural of said elements or steps, unless such exclusion is explicitly stated. Furthermore, references to "one embodiment" of the inventive subject matter are not intended to be interpreted as excluding the existence of additional embodiments that also incorporate the recited features. Moreover, unless explicitly stated to the contrary, embodiments "including," "comprising," or "having" (and various forms thereof) an element or a plurality of elements having a particular property may include additional such elements not having that property.

The systems described herein can include or represent hardware and associated instructions (e.g., software stored on a tangible and non-transitory computer readable storage medium, such as a computer hard drive, ROM, RAM, or the like) that perform the operations described herein. The hardware may include electronic circuits that include and/or are connected to one or more logic-based devices, such as microprocessors, processors, controllers, or the like. These devices may be off-the-shelf devices that perform the operations described herein from the instructions described above. Additionally or alternatively, one or more of these devices may be hard-wired with logic circuits to perform these operations.

As used herein, the term "vehicle system" includes one or more vehicles that generate tractive effort to travel along a route. Unless otherwise specified (e.g., as a non-propulsion-generating vehicle), the term "vehicle" alone refers to a propulsion-generating vehicle that provides the tractive forces to propel the vehicle system along the route. The term "consist" can refer to a group of one or more vehicles that are mechanically and/or logically linked together to travel along a route. A vehicle system may include a single consist or two or more consists linked together. According to various aspects of the inventive subject matter described herein, a consist may be defined based on one or more of the following: mechanical linkages, where vehicles in a consist are mechanically linked and adjacent to at least one other vehicle in the consist; electrical linkages, where vehicles are electrically linked for possibly transferring electrical power between the vehicles; and/or operational/functional linkages, where plural vehicles are controlled in a coordinated manner, e.g., certain modes of distributed power operations. As one example, in a rail vehicle context, a locomotive consist comprises plural locomotives that are mechanically (and possibly electrically) linked together, with each locomotive linked and adjacent to at least one other locomotive in the consist. For example, a consist of vehicles, or a vehicle consist, may include two or more vehicles that are mechanically coupled with each other and/or that communicate with each other over one or more wired and/or wireless connections to coordinate control of tractive efforts and/or braking efforts of the vehicles in the consist.

Although one or more embodiments are described and shown with respect to rail vehicle systems, including trains, locomotives, and other rail vehicles, not all embodiments are so limited. For example, one or more embodiments also are applicable for use with vehicles generally, such as off-highway vehicles (e.g., vehicles that are not designed and/or not permitted to travel on public roads), agricultural vehicles, automobiles and other transportation vehicles, and/or marine vessels.

In a distributed power operation, the term "lead vehicle" refers to a vehicle that controls operations of one or more vehicles in the vehicle system, and does not necessarily mean the vehicle disposed at a front or leading end of a vehicle system. For example, a lead locomotive in a train may not be disposed at the front end of a train. The term "remote vehicle" refers to a vehicle other than the lead vehicle in a vehicle system. For example, a remote vehicle may include a locomotive that is controlled by a lead locomotive in a train. The term "remote" does not require a predetermined spacing or separation between items. For example, a remote vehicle may be directly coupled with a lead vehicle. A vehicle system may have a lead consist, which includes the lead vehicle mechanically linked to one or more remote vehicles, and may also have one or more remote consists, formed entirely of remote vehicles, positioned at a different location in the vehicle system. Some vehicle systems may have single vehicles positioned within the train and separated from other vehicles by one or more non-propulsion vehicles (e.g., cargo or passenger cars on a rail vehicle system). The vehicle consists may also be separated by non-propulsion vehicles.

FIG. 1 is a schematic illustration of a vehicle network 100 in accordance with an embodiment. The illustrated vehicle network 100 may be a segment of a larger vehicle network. The vehicle network 100 includes several routes 102, including route 103, route 104, route 105, route 106, and route 107. Optionally, the vehicle network 100 may include more or less than the five routes 103-107 shown in FIG. 1. Some routes 102 may intersect other routes 102 in the network 100. For example, route 103 intersects routes 106 and 107, route 104 intersects routes 105 and 106, and route 105 intersects routes 104, 106, and 107. A plurality of vehicle systems 108 may concurrently travel on the network 100 of routes 102. For example, as shown in FIG. 1, vehicle system 109 travels along route 103, vehicle system 110 travels along route 106, vehicle system 111 travels along route 104, and vehicle system 112 travels along route 105. Although four vehicle systems 108 are shown in FIG. 1, the network 100 may include any number of vehicle systems 108. Each vehicle system 108 may include one or more propulsion-generating vehicles coupled to other propulsion-generating vehicles and/or non-propulsion-generating or load vehicles (e.g., vehicles that are not capable of providing motive power but that may consume electric energy for one or more purposes). The non-propulsion-generating vehicles may be configured for carrying cargo and/or passengers along the route 102. Each vehicle system 108 travels along one or more routes 102 in the vehicle network 100 on a trip between a starting/departure location and a destination/arrival location.

The routes 102 may include one or more conductive pathways 114 extending along the routes 102. The conductive pathways 114 may transmit electric energy from a power source 116. The power source 116 may be one or more power plants, such as coal, nuclear, and/or natural gas power plants. Optionally, the power source 116 may represent one or more other energy sources, such as renewable energy sources (e.g., wind, water, solar, geothermal, and other energy sources used to generate electric current). The term "electric energy" as used herein may refer to current, voltage, power (e.g., wattage), and the like. The term "current" as used herein refers to the rate of transfer of electric energy, and includes direct current (e.g., voltage) and/or alternating current (e.g., time-varying voltage). The electric energy transmitted by the power source 116 along the conductive pathways 114 may form at least part of an electrical power grid 118. The electrical power grid 118 delivers electric energy from the power source 116 through the conductive pathways 114 to power one or more loads. Optionally, the electrical power grid 118 may be powered by more than one power source 116.

The electrical power grid 118 has a grid capacity that represents an available amount of electrical energy on the electrical power grid 118 for powering one or more loads at one time. The grid capacity may be limited by transmission hardware, such as the available amount of electrical energy that can be transmitted by the conductive pathways 114, and/or the one or more power sources 116 that supply the electrical energy, which have a generating capacity restricted by fuel, size of power plan, etc. The term "capacity" may refer to an available rate of energy transfer (e.g., current), an available power (e.g., wattage), an available voltage, and the like.

In an embodiment, the only loads that demand electrical energy from the power grid 118 are loads on the vehicle systems 108. As such, the grid capacity represents the available amount of electrical energy for powering one or more loads on the vehicle systems 108 traveling on the network 100. Alternatively, the electrical power grid 118 may supply electrical energy to power loads of the vehicle systems 108 as well as other loads, such as residential loads, commercial loads, and the like, in cities, towns, and/or rural areas. In such case, the available amount of electrical energy on the grid 118 for powering loads on the vehicle systems 108 may decrease due to varying amounts of electrical energy demanded by other loads at different times. For example, at peak usage times of the day, such as in the afternoon or early evening, the available amount of electrical energy for powering the vehicle systems 108 potentially may be less because there is a greater demand from non-vehicle (e.g., residential) loads.

As used herein, exceeding or overdrawing the available amount of electrical energy on the power grid is synonymous with exceeding the grid capacity because the available amount of electrical energy is partially defined by the grid capacity. For example, if the grid capacity is 50 megawatts (MW) and demand at time $t_x$ is 30 MW, then the available amount of electrical energy on the electrical power grid at time $t_x$ 20 MW. If the vehicle systems demand 25 MW at time $t_x$, the demand would exceed the available amount of electrical energy (e.g., 25 exceeds 20 MW) as well as the grid capacity (e.g., 25 MW plus 30 MW equals 55 MW, which exceeds 50 MW). Therefore, exceeding the available amount of electrical energy on the grid implies that the grid capacity is exceeded. As such, the phrases "exceeding an available amount of electrical energy on the electrical power grid" and "exceeding the grid capacity" are used interchangeably herein. Furthermore, "monitoring the available amount of electrical energy on the electrical power grid" is used interchangeably with "monitoring the grid capacity".

In an embodiment, electric propulsion-generating vehicles in the vehicle systems 108 draw electrical energy from the grid 118 via the conductive pathways 114. The term "draw" as used herein refers to the act of consuming electrical energy that is supplied by the conductive pathways. The term "demand" as used herein refers more specifically to the amount or rate of electrical energy usage that is sought (e.g., demanded) by the electric vehicles either at a present or a future time. For example, the rate of electrical energy demanded by an electric vehicle may be the same rate or a slightly different rate than the actual rate drawn via the conductive pathways.

The drawn electrical energy is used to power one or more loads on the vehicle systems 108, such as propulsion-generating loads, compressor loads, passenger loads, etc. All of the vehicle systems 108 traveling on the network 100, such as vehicle systems 109-112, may demand electrical energy from the grid 118 at the same time, which reduces the available amount of electrical energy on the grid 118 by an amount roughly equal to the cumulative energy draw of the vehicle systems 108 at that time. If the source 116 of electrical energy cannot meet the demands for electrical energy of the vehicle systems 108, one or more vehicle systems 108 may stall along the routes 102 due to inadequate power, which may delay various other vehicle systems 108 on or around the affected routes. In addition, if the demanded amount of electrical energy exceeds the grid capacity at one time, various routes 102 on the network 100 may experience power outages which also cause delays.

In an embodiment, the vehicle systems 108 traveling on the network of routes 102 include rail vehicles traveling on a network of tracks. For example, the rail vehicles may include one or more electric locomotives or locomotive consists coupled to one or more non-electric (e.g., diesel, gas turbine, etc.) locomotives and/or one or more non-propulsion rail cars, such as passenger cars and/or cargo cars. In addition, the conductive pathways 114 may include electrified rails (e.g., third rail or fourth rail systems) and/or catenary wires.

The energy demand of each vehicle system 108 traveling on the network 100 represents the amount of electrical energy that is sought (and converted to power) to allow the vehicle system 108 to travel along the route 102 for the duration of the trip. For example, electric locomotives may demand up to 6 MW of power or more. The energy demand may not be constant at all times during the trip, and two different vehicle systems 108 traveling on the same route 102 may also not demand the same amount of electrical energy.

Energy demand of vehicle systems 108 varies according to factors such as route taken, vehicle makeup, and movement characteristics. Characteristics of a route that may affect energy demand include the grades of the route, the curvatures of the route, weather conditions (e.g., wind speed and direction), the number of stops and starts (e.g., at stations along the route), and the like. For example, vehicle system 112 traveling on route 105 may travel along hilly or mountainous terrain and demand more electrical energy while ascending the terrain than vehicle system 109 traveling on flat terrain. Vehicle makeup characteristics include the number and type of propulsion-generating vehicles and non-propulsion-generating vehicles in the vehicle system 108, the type and amount of cargo (e.g., coal, passengers, freight, etc.), the presence or absence of precipitation on the vehicle system 108, the length of the vehicle system 108, the configuration of the propulsion-generating vehicles relative to the non-propulsion-generating vehicles, and the like. Many of the listed characteristics affect the weight and weight distribution of the vehicle system 108. In general, a vehicle system 108 must demand a greater amount of electric energy as the weight increases. Movement characteristics include the speed and acceleration of the vehicle system 108, the number of electric propulsion-generating vehicles that are actively providing motive power, and the use of regenerative braking and/or alternate sources of energy (e.g., diesel propulsion-generating vehicles, solar panels, etc.) to supplant the amount of electrical energy demanded from the grid. Generally, operating a vehicle system 108 at a greater speed, acceleration, and using more electric propulsion-generating vehicles requires a greater demand of electrical energy, although the use of regenerative braking and/or alternate sources of energy reduces the electrical energy demand.

The network 100 may further include a network planner system 120. The network planner system 120 may be located off-board the vehicle systems 108, such as at a dispatch location. In an alternative embodiment, the network planner system 120 may be located onboard one vehicle system 108 in the network 100. The network planner system 120 includes a communication system 122. The communication system 122 may include an antenna for communicating wirelessly with, for example, vehicle systems 108 traveling on the network 100. In an embodiment, the network planner system 120 may be configured to monitor the energy demand of the vehicle systems 108 on the network 100. In addition, the network planner system 120 may be configured to monitor the grid capacity (e.g., the available amount of electrical energy for powering one or more loads) of the electrical power grid 118. Furthermore, the network planner system 120 may be configured to control the demand of the electric vehicle systems 108 traveling on the network 100 to prevent the energy draw of the electric vehicles from exceeding the grid capacity.

Figure 2:
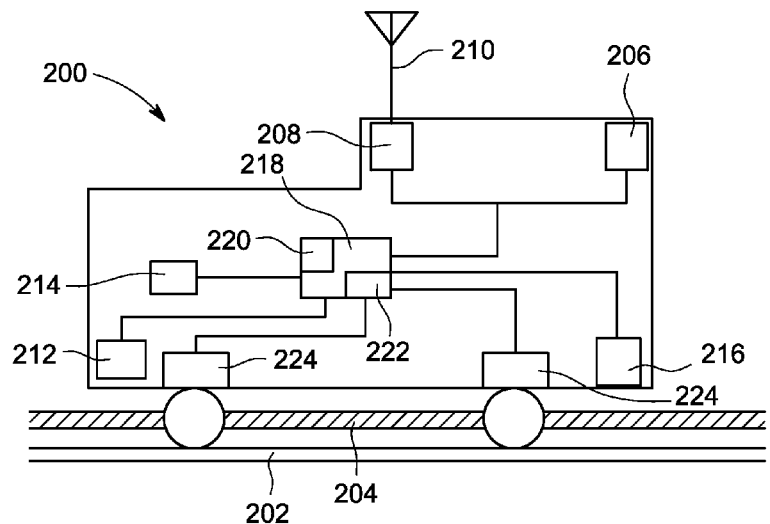
FIG. 2 illustrates an electric propulsion vehicle in accordance with an embodiment.

FIG. 2 illustrates an electric propulsion-generating vehicle 200 according to an embodiment of the present invention. The electric propulsion-generating vehicle 200, also referred to herein as electric vehicle 200, may be part of the vehicle systems 108 shown in FIG. 1. The electric vehicle 200 travels along a route 202. Although shown in solitary, the electric vehicle 200 may be coupled in front and/or behind to other propulsion and/or non-propulsion vehicles to define a vehicle system 108. The electric vehicle 200 may be configured to draw electrical energy from a conductive pathway 204 along the route 202 to power one or more loads on the electric vehicle 200, such as to provide tractive force to propel the vehicle 200 and additional vehicles in the same vehicle system. The electric vehicle 200 includes a propulsion subsystem 224 that may include one or more electric motors that provide the tractive forces for propulsion. The conductive pathway 204 may be similar to the conductive pathway 114 (shown in FIG. 1). As shown in FIG. 2, the conductive pathway 204 may be a third rail or fourth rail system as is known in the art. Alternatively, the conductive pathway 204 may extend above and/or alongside the electric vehicle 200 as a catenary wire.

The electric vehicle 200 may include a locator element 206 to determine a location of the electric vehicle 200. The locator element 206 may be a GPS sensor, or a system of sensors including, for example, GPS sensor, video determination, wayside devices, radio frequency automatic equipment identification (RF AEI) tags, and the like. A wireless communication system 208 may be provided to allow for communications between trains and/or with remote locations, such as dispatch. The wireless communication system 208 may include a transceiver (not shown), an antenna 210, and associated circuitry to permit transmission and receipt of off-board communications. The communications may include information about travel plans and locations. The electric vehicle 200 may also include a route characterization element 212 to provide information about a route, including grade, elevation, and curvature information. The route characterization element 212 may include an on-board route database 214. The database 214 stores information about past routes traveled, a current route undertaken, and proposed future routes, including re-route options. Furthermore, sensors 216 may be installed on the electric vehicle 200 to measure the current energy draw of the vehicle 200 from the electrical power grid. In addition, sensors 216 may measure the weight of the vehicle system 108 (shown in FIG. 1), a throttle setting of the electric vehicle 200, speed of the vehicle 200, capability of the electric vehicle 200, etc.

In an embodiment, the electric vehicle 200 includes a trip planner system 218. The trip planner system 218 is configured to interpret various input information regarding a current and/or proposed trip and produce a trip plan. The trip plan may dictate or establish various tractive efforts and/or braking efforts of the different electric vehicles 200 in a vehicle system for different portions or segments of the trip of the vehicle system. For example, in a distributed power vehicle system, the trip plan may include different throttle settings and/or brake settings for the lead vehicle and remote vehicles of the vehicle system during various segments of the trip. For example, the trip plan may be created to minimize energy consumption (e.g., electrical energy draw from the electrical power grid) and establish a desired trip time, while abiding by safety and regulatory restrictions. Following the trip plan may result in the vehicle 200 consuming less fuel/generating fewer emissions than the same vehicle 200 traveling along the same routes to the same destination location within the same time period (or within a relatively small time buffer of the same time period, such as one percent, three percent, five percent, or another relatively small percentage of the total trip time), but traveling at speed limits of the routes (e.g., track speeds).

The trip plan may be based on a trip profile that includes information related to the electric vehicle 200, the vehicle system, the route, including the geography over which the route extends, and various objectives of the trip, such as time constraints and limited energy draw/consumption. The information for the trip profile may be collected by the locator element 206, route characterizing element 212, route database 214, and/or sensors 216. Additional information may be collected from external sources, such as sensors on different electric vehicles on the same or different vehicle systems and information transmitted from dispatch and/or a wayside device.

The trip profile may be based on, or include, vehicle data, route data, trip data, and/or updates to the vehicle data, route data, and/or trip data. Vehicle data includes information about the electric vehicles 200 and/or cargo being carried on the vehicle system. For example, vehicle data may represent cargo content (such as information about the cargo being transported) and/or vehicle information (such as model numbers, fuel efficiencies, manufacturers, horsepower, and the like of electric vehicles and/or other propulsion and non-propulsion vehicles in the vehicle system). Route data includes information about the route upon which the vehicle system travels currently and/or in the future. For example, route data may include information about locations of damaged sections of the route that are under repair or construction, the curvature and/or grade of the route, GPS coordinates of the route, and the like. Trip data includes information about an upcoming trip by the vehicle system. Based on a selected trip from a beginning location to an ending location, the trip data may, for example, include station information for the departure station at the beginning of the trip and/or arrival station at the end of the trip, restriction information (such as identified work zones and/or route repairs), and/or operating/movement information (such as speed/throttle limitations in various congested areas, slow orders, work zones, and the like).

In an alternative embodiment, the trip planner system 218 may be located off-board the electric vehicle 200, such as at a dispatch. In such alternative case, input information regarding the trip profile from the sensors 216, locator element 206, route characterization element 212, route database 214, etc. may be transmitted via the wireless communication system 208 to the off-board trip planner system, where the information is interpreted to produce a trip plan which is transmitted back to the electric vehicle 200.

The trip planner system 218 further includes a processor 220 that is operable to receive the trip profile information. Generally, in various embodiments, the processor 220 may include processing circuitry such as one or more field programmable gate array (FPGA), application specific integrated circuit (ASIC), or microprocessor. The processor 220 in various embodiments may be configured to execute one or more algorithms to perform functions described herein. The one or more algorithms may include aspects of embodiments disclosed herein, whether or not expressly identified in a flowchart or as a step of a method. For example, the processor 220 may execute an algorithm to interpret the received information and compute the trip plan. The trip plan may be established based on models for vehicle behavior as the electric vehicle 200 moves along the route as a solution of non-linear differential equations derived from physics with simplifying assumptions. In an embodiment, the trip planner system 218 includes a software application such as the Trip Optimizer™ software application provided by General Electric Company, to control propulsion operations of the electric vehicles 200 in the vehicle system during the trip.

The electric vehicle 200 may further include a controller element 222. The controller 222 is configured for controlling the electric vehicle 200 as it follows the trip plan. The controller element 222 optionally may be an integral component of the trip planner system 218, as shown in FIG. 2. In an embodiment, the controller 222 makes vehicle operating decisions autonomously. For example, the controller 222 may generate control signals based on the operational settings designated by the trip plan that are communicated to one or more propulsion subsystems 224 of the electric vehicles 200 of the vehicle system to cause the electric vehicles 200 to autonomously follow the operational settings of the trip plan. Alternatively, or additionally, the control signals may be communicated to an output device onboard one or more of the electric vehicles 200, where the output device is configured to inform an operator of the one or more vehicles 200 of the designated operational settings. The operator may then manually implement the designated operational settings to follow the trip plan.

In an embodiment, the trip plan includes an energy usage plan. The energy usage plan details the electrical energy demanded along the route traveled by the electric vehicle 200. The energy usage plan may be an extension of the trip plan. For example, while the trip plan instructs a controller 222 and/or operator, for example, what routes to take and/or what speeds to travel based on considerations identified in the trip profile, the energy usage plan calculates the amount of electrical energy that will be demanded from the grid by the electric vehicles 200 on the vehicle system in carrying out the trip plan. Like the trip plan, the energy usage plan is produced by the processor 220 within the trip planner system 218, such as by using an algorithm that may be within software. Also like the trip plan, the energy usage plan is a calculated estimation for a proposed trip, since many variables affect the actual energy drawn from the grid during the trip.

Figure 3:
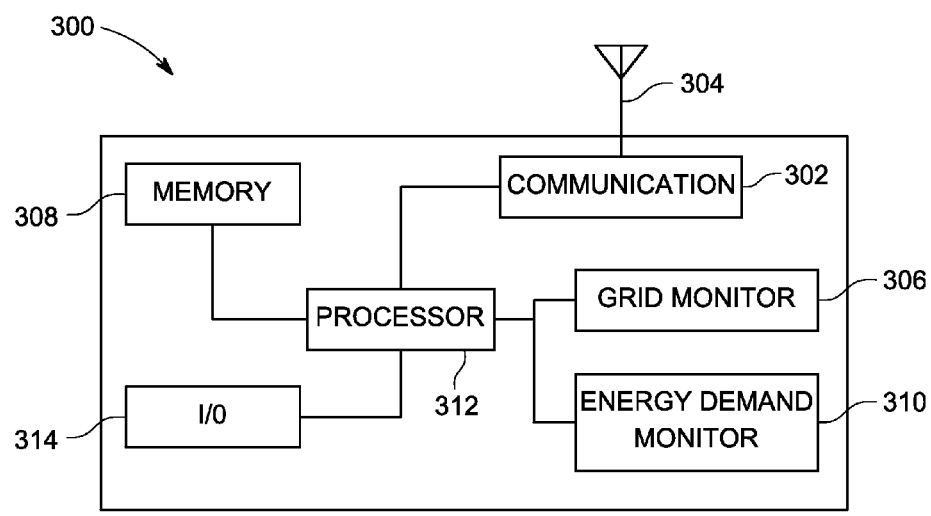
FIG. 3 is a network planner system in accordance with an embodiment.

FIG. 3 is a network planner system 300 in accordance with an embodiment. The network planner system 300 may be the network planner system 120 shown in FIG. 1. The network planner system 300 includes a communication system 302. The communication system 302 may include a transceiver (not shown), an antenna 304, and associated circuitry to permit transmission and receipt of communications to and from electric vehicles on vehicle systems 108 (shown in FIG. 1) traveling in the network 100 (shown in FIG. 1). The communications may be transmitted wirelessly using radio communication, Wi-Fi, microwave communication, and the like. Optionally, wired connections, such as in a wide area network (WAN) may be used in addition to, or instead of, wireless communications via antenna 304. In an embodiment, the wireless communication system 302 is configured to receive trip plans, including the energy usage plans, from the vehicle systems 108 in the network 100. For example, once the trip planner system 218 (shown in FIG. 2) of an electric vehicle 200 (shown in FIG. 2) computes a trip plan for a proposed upcoming trip, the trip plan is communicated from the communication system 208 (shown in FIG. 2) to the network planner system 300 via the communication system 302. Optionally, the communication system 302 may be used to communicate with off-board locations, such as remote dispatch locations, wayside devices, and/or various stations within the network 100. In addition, the communication system 302 may allow the network planner system 300 to communicate remotely to network planner systems of neighboring networks of routes, or neighboring sub-networks of routes.

The network planner system 300 also includes a grid monitoring device 306. The grid monitoring device 306 is configured to monitor the available amount of electrical energy on the electrical power grid 118 (shown in FIG. 1). The grid monitoring device 306 may include sensors and/or other equipment to measure the voltage and/or current on a real-time basis. For example, equipment such as multimeters, transformers, transducers, and the like may be used to measure electrical grid 118 operating conditions. The grid monitoring device 306 may monitor the grid capacity in real-time so the network planner system 300 is able to track the available amount of electrical energy on the grid 118 that may be demanded by the vehicle systems 108 traveling on the network 100 (both shown in FIG. 1) without overdrawing. Alternatively, or in addition, the grid monitoring device 306 may receive real-time updates regarding current grid capacity measurements from a power source that supplies electrical energy to the grid 118, such as power source 116 (shown in FIG. 1), or another source that continuously monitors the electrical power grid 118. The grid monitoring device 306 may record the updates or logs of available electrical energy, such as daily records, to determine a projected available amount of electrical energy at a future time. For example, if the available amount of energy on the grid at noon each day for a week is 30 MW within 2 MW, then the projected available amount of electrical energy the next day at noon is projected to be at least 28 MW.

Optionally, monitoring the available amount of electrical energy includes monitoring the available amount of electrical energy of a specific section of the electrical power grid instead of or in addition to monitoring the entire grid. The movements of the electric vehicles traveling on a sub-network of routes powered by the section of the electrical power grid are controlled such that the electrical energy demand does not exceed the available amount of electrical energy on the section. Optionally, the grid monitoring device 306 may store a log of measured and/or received grid 118 operating conditions in an internal memory (not shown) and/or in a memory 308 of the network planner system 300. The memory 308 may be a hard disk drive, a server, CD drive, DVD drive, flash memory drives (e.g., USB flash drives), floppy disks, random-access memory (RAM), read-only memory (ROM), and the like. Optionally, the network planner system 300 may store data on an external memory storage device (not shown) in addition to, or instead of, memory 308.

The network planner system 300 further includes an energy demand monitoring device 310. The energy demand monitoring device 310 is configured to monitor the energy demand of the vehicle systems 108 on the network 100 (both shown in FIG. 1). In an embodiment, the energy demand monitoring device 310 monitors energy demand by analyzing energy usage plans received from electric vehicles 200 (shown in FIG. 2) of the vehicle systems 108 on the network 100. For example, the energy usage plans received by the communication system 302, as part of the trip plans or as separate extensions of the trip plans, are passed to the energy demand monitoring device 310. The energy demand monitoring device 310 may be configured to summate or total the energy usage plans to calculate the electrical energy demand on the network 100 at a specific time and/or over a period of time. As used herein, electrical energy demand may refer to an electrical energy demand of a single electrical vehicle and/or a cumulative electrical energy demand of multiple electrical vehicles on the network. The cumulative energy demand represents the total electrical energy demanded from the grid by vehicle systems 108 traveling on the network 100 at a specific time.

Since energy usage plans may be computed prior to embarking on proposed trips, the energy demand calculated by summating the energy usage plans may represent a projected energy demand at a specific future time. For example, at time X, the energy demand monitoring device 310 may have energy usage plans detailing projected energy consumption for individual vehicle systems 108 between times X+1 and X+10. Therefore, the energy demand monitoring device 310 may be configured to calculate the projected energy demand at time X+5, for example, by summating the individual energy demands at time X+5 in the received energy usage plans. Furthermore, the projected energy demand between the range X+1 and X+10 may be computed and optionally plotted versus time. The projected energy demand may then be compared to the expected grid capacity at the same specific time or over the same time range to determine whether there is a possibility of overdrawing the grid capacity.

Additionally, the energy demand monitoring device 310 may be configured to monitor current energy demand from electric vehicles 200 (shown in FIG. 2) within vehicle systems 108 (shown in FIG. 1) traveling on the network 100 (shown in FIG. 1). For example, the electric vehicles 200 may also send real-time data to the network planner system 300 collected from the sensors 216 (shown in FIG. 2) that measure the current energy demand and/or draw from the electrical power grid during operation. For example, the electric vehicles 200 may be configured to transmit real-time energy demand data to the network planner system 300 periodically, such as every 10 seconds, every minute, or every 5 minutes. The energy demand monitoring device 310 may be configured to receive the current energy demand information from all of the electric vehicles 200 currently traveling on the network 100, and total the data to determine a current or actual electrical energy demand. An actual electrical energy demand that exceeds the grid capacity may stall one or more of the electric vehicles 200, causing delays and potentially damaging electrical components of the vehicles 200 and/or the conductive pathways 204 (shown in FIG. 2) along the routes 202 (shown in FIG. 2). To prevent such an occurrence, the network planner system 300 is configured to control movements of the electric vehicles 200 to prevent the cumulative energy demand from exceeding the available amount of electrical energy on the electrical power grid 118 (shown in FIG. 1), as discussed further in detail below.

In an embodiment, the energy demand monitoring device 310 is configured to compare the measured actual electrical energy demand at one time to the projected energy demand at that time to determine if the projected energy demand, based on received energy usage plans, was an accurate predictor of future energy use at that time. For example, as stated in the hypothetical above, based on energy usage plans received at current time X regarding projected energy use per vehicle 200 (shown in FIG. 2) between future times X+1 and X+10, the energy demand monitoring device 310 may calculate a projected energy demand at the specific future time X+5. The units of time in the hypothetical may be seconds, minutes, or hours. Later on at time X+5, the energy demand monitoring device 310 may calculate the actual electrical energy demand at time X+5 based on received real-time information collected from the sensors 216 (shown in FIG. 2) on the individual vehicles 200. The actual electrical energy demand at time X+5 should be relatively close to the projected energy demand at that time, so the network planner system 300 may use the projected energy demand to make determinations about energy consumption on the network 100 at forthcoming times.

The determinations may include, for example, whether to reduce forthcoming energy consumption to prevent the cumulative energy demand from exceeding the grid capacity. If the actual electrical energy demand is substantially more or less than the projected energy demand, the network planning system 300 may make an adjustment. In addition to comparing cumulative energy demands, the energy demand monitoring device 310 may be configured to compare projected versus actual energy demands on a vehicle-by-vehicle basis to determine if the energy usage plan of one or more of the electric vehicles was inaccurate and the trip planner system 218 (shown in FIG. 2) needs adjustment. Adjustments may include calibrating one or more of the sensors 216, one or more trip planner systems 218 that calculate the individual energy usage plans, and/or the network planner system 300 which determines the cumulative energy usage plan.

The network planner system 300 further includes at least one processor 312. The processor 312 processes the data received by the various inputs of the network planner system 300, such as the communication system 302 and various inputs operatively connected to an input/output (I/O) device 314. For example, the I/O device 314 may receive inputs from user devices, such as a keyboard, a mouse, a hand-held device (e.g., cell phone, tablet, PDA, etc.), and/or a graphical user interface on a display device. The processor 312 may include or be a component of a microcontroller, controlling the functions of the network planner system 300. An algorithm may operate within the processor 312 to interpret the received information and provides results as output. For example, the results may be output as operating instructions that are communicated to electric vehicles 200 (shown in FIG. 2) using the communication system 302. In addition, results may be output as charts, graphs, and/or other indicia displayed on a user display for an operator of the network planner system 300. Optionally, results may be stored in the memory device 308 or sent to an external storage device.

In an embodiment, the processor 312 of the network planner system 300 is configured to communicate with the trip planner systems 218 (shown in FIG. 2) on the one or more electric vehicles 200 (shown in FIG. 2) to control movements of the electric vehicles 200 such that the electrical energy demand of the electric vehicles 200 does not exceed the available amount of electrical energy on the electrical power grid. One way the processor 312 of the network planner system 300 controls movements of the electric vehicles 200 is by allocating to each electric vehicle 200 on the network 100 (shown in FIG. 1) a maximum amount of electrical energy that can be consumed at one or more times along the trip. The movements of the electric vehicles 200 are controlled because the trip planner systems 218 must configure a trip plan that does not demand more than the allocated maximum amount of electrical energy. The maximum amounts of electrical energy allocated to each electric vehicle 200 may be determined based on the monitored available amount of electrical energy on the grid at the time, the number of electric vehicles 200 traveling in the network 100 at the time, and/or the individual trip plans and energy usage plans of each vehicle 200 received by the network planner system 300 and processed by the one or more processors 312. The maximum amounts of electrical energy are determined such that all of the electric vehicles 200 consuming the designated maximum amount of electrical energy at the time would not overdraw the grid capacity.

For example, during the planning of a trip on the network 100 (shown in FIG. 1) by a vehicle system 108 (shown in FIG. 1) having one or more electric vehicles 200 (shown in FIG. 2), the processor 312 controls the communication system 302 to send the vehicle system 108 the available energy for the trip. The available energy may be determined based on the number of vehicle systems 108 are traveling on the network 100 and/or their energy usage plans. In an embodiment, all vehicle systems 108 are allocated the same amount of electrical energy at one time. Therefore, if the grid capacity is 100 MW, and there are 25 vehicle systems 108 traveling on the network 100, each vehicle system would be allocated a maximum amount of electrical energy of no greater than 4 MW.

Alternatively, in another embodiment, the processor 312 of the network planner system 300 dynamically allocates maximum amounts of electrical energy consumption that may differ based on received trip plans/energy usage plans of the vehicles 200. For example, if at time X+5 a first vehicle system's trip plan has the first vehicle traveling up an incline grade hauling 10,000 tons of coal, the electric vehicles of the first vehicle system would generally require more electrical energy at time X+5 than a second vehicle system that is traveling along a flat grade or a decline, or possibly even stationary at a scheduled stop, at the same time. In such case, the processor 312 of the network planner system 300 would dynamically allocate the first vehicle system with an amount of electrical energy at time X+5 that is greater than the amount allocated to the second vehicle system. Therefore, the amount of electrical energy allocated to each electric vehicle 200 may not be equal among all of the electric vehicles 200 traveling in the network. In addition, the allocated amount of electrical energy may change based on time, so, for example, at time X+10 the second vehicle system may be allocated a greater amount of electrical energy than the first vehicle. Therefore, by monitoring the trip plans and energy usage plans, the network planner system 300 may provide allocated amounts of electrical energy to the vehicles 200 that are tailored to the specific trip conditions of the vehicles 200.

In an embodiment, allocated amounts of electrical energy to the electric vehicles 200 traveling on the network 100 at specific times may be presented by the processor 312 of the network planner system 300 in a network energy consumption plan. The network energy consumption plan may provide the allocated energy information described above. For example, the energy consumption plan may communicate energy consumption parameters to the individual electric vehicles 200 on the network 100 to inform each vehicle 200 (e.g., the controllers or operators of the vehicles) of the maximum amount of electrical energy allocated to each vehicle 200 at various times over the duration of the trip. Optionally, the network energy consumption plan may also include information regarding the estimated grid capacity over a period of time, as well as the projected energy demand by the vehicles 200 during the period. The processor 312 of the network planner system 300 may be configured to display the network energy consumption plan as a report or various charts and graphs to a user near the network planner system 300 or to remote users via a network (e.g., the Internet). Since the network planner system 300 may be configured to receive real-time updates of the monitored information, the network energy consumption plan may also be configured to continuously or periodically update automatically to show up-to-date information on grid capacity and actual electrical energy demand, for example.

In an embodiment, a new electric vehicle 200 that will be traveling on a trip on the network 100 communicates such intent to the network planner system 300, and the processor 312 controls the communication system 302 to send in response an allocated amount of energy for the trip. The energy allocated for the trip may be determined by subtracting the available amount of electrical energy on the grid by the cumulative energy demand of previously-known electric vehicles 200 that will be on trips in the network 100 during the same time. If, for example, the amount of electrical energy allocated by this determination does not provide enough energy for the new electric vehicle 200 to meet its trip objectives as outlined in its trip plan, the processor 312 may recalculate the allocated amounts of electrical energy to all of the vehicles 200 to reduce the cumulative energy demand to accommodate the addition of the new electric vehicle 200 that will be traveling on the network 100. The recalculated allocations may be reported in an updated network energy consumption plan. Therefore, in an embodiment, each time the network planner system 300 receives one or more new trip plans, the processor 312 may modify the amounts of electrical energy previously allocated to other vehicles 200 traveling in the network 100 to accommodate the additional electric vehicles 200 to prevent the electrical energy demand from exceeding the grid capacity.

In addition, the processor 312 of the network planner system 300 may be configured to make similar modifications each time a vehicle 200 completes its trip on the network and/or each time a trip re-plan occurs for a vehicle 200 already traveling on the network 100. A trip re-plan is an updated trip plan that may be based on various conditions, such as a necessary trip reroute or a faulty calculation that led to an inaccurate trip plan and/or energy usage plan. Furthermore, the processor 312 may modify the allocated energy amounts of the vehicles 200 whenever a projected energy demand is calculated to exceed a threshold available amount of electrical energy on the grid. For example, vehicles 200 currently traveling in the network 100 may receive real-time updates to limit power consumption to avoid overdrawing the grid capacity. The various modifications that the network planner system 300 and/or the trip planner systems 218 (shown in FIG. 2) may make are described in more detail below.

Figure 4:
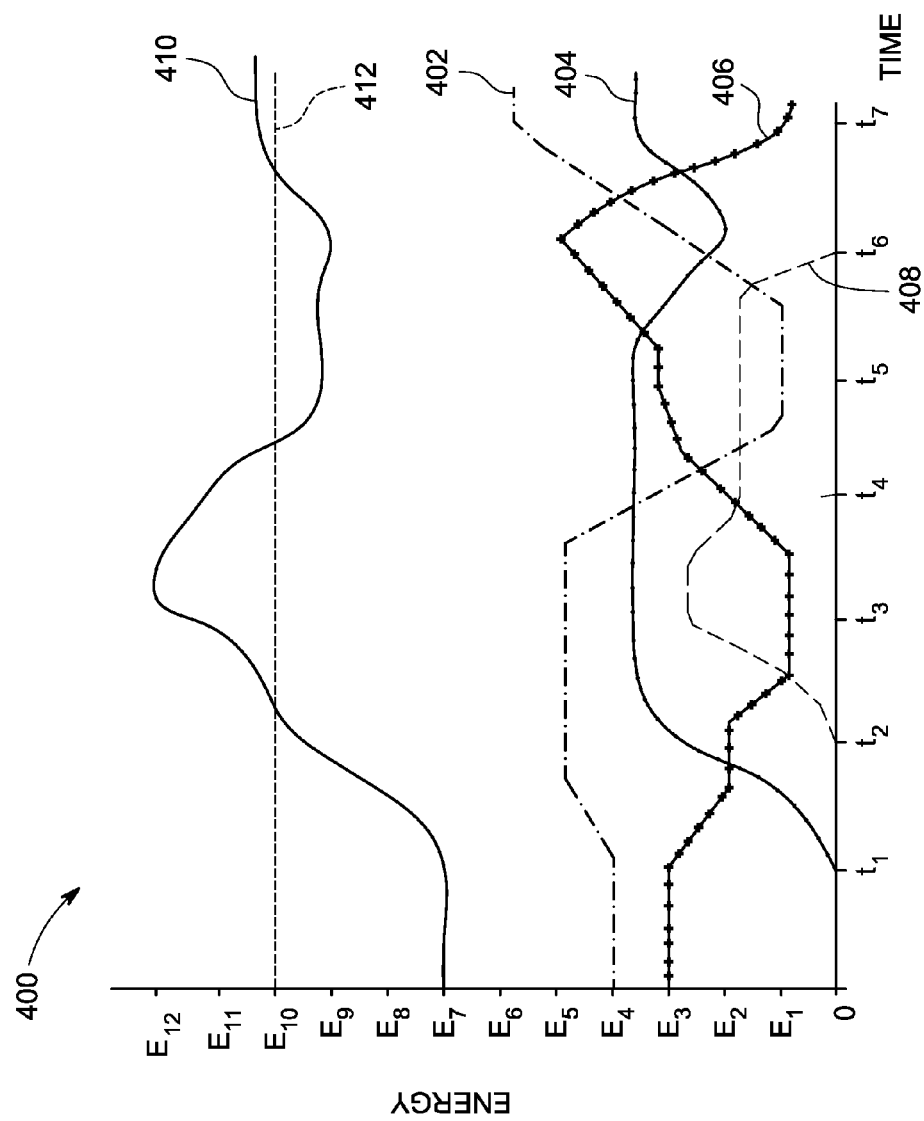
FIG. 4 is a graph showing energy usage plans of electric vehicles on a network over time.

FIG. 4 is a graph 400 showing energy usage plans of electric vehicles on a network over time. The electric vehicles may be the electric vehicles 200 (shown in FIG. 2), and the network may be the network 100 of routes 102 (both shown in FIG. 1). The graph plots energy versus time, which shows power consumption of the vehicles 200 (e.g., P=E/t, with the amount of power consumed equal to the area under the curves). The time axis is labeled $t_1$, $t_2$, $t_3$, etc., though the labels may represent, for example, minutes or hours, including groups of minutes or hours (e.g., $t_2$ may be 30 minutes after $t_1$). The energy axis is labeled $E_1$, $E_2$, $E_3$, etc., though the labels may represent, for example, kilojoules or megajoules, including groups of kilojoules or megajoules (e.g., $E_1$ may be 10 megajoules and $E_2$ may be 20 megajoules). In the graph 400, four energy usage plans are plotted, 402, 404, 406, and 408. Each energy usage plan represents the anticipated energy use over time for an individual vehicle system including one or more electric vehicles 200 traveling on the network on a trip during the time period shown. For example, each energy usage plan 402-408 may correspond with a respective one of the vehicle systems 109, 110, 111, and 112, shown in FIG. 1. The energy usage plans may be calculated as part of a trip plan.

As shown in the graph 400, the energy usage plans are not uniform, as variables such as trip timing schedules, vehicle makeup, route, movement characteristics, and the like affect the amount of electrical energy demanded at different times. For example, at time t1, only the vehicle systems represented by the energy usage plans 402 and 406 are actively demanding energy from the grid, which might indicate that the vehicles represented by energy usage plans 404 and 408 have not yet begun their scheduled trips. At time $t_3$, energy usage plan 402 projects the highest energy demand, followed by plan 404, plan 408, and finally plan 406. Energy usage plan 402 may be higher than the other plans because, for example, the vehicle system makeup includes a load with the most weight being hauled by the electric vehicles 200, which required more power to haul. For example, energy usage plan 402 may be for a coal train that over a mile in length, while energy usage plan 408 may be for a passenger train having 15 or fewer passenger vehicles. In another example, the route location of the vehicle system represented by plan 402 around time $t_3$ may have the vehicle system traveling up an incline grade, which could explain the higher power needed. Furthermore, the higher energy demand of plan 402 could be explained by the vehicle system traveling at a higher rate of speed than other vehicle systems in order to stay on a tight time schedule. Even along one energy usage plan, the energy demand may modulate over time. For example, energy demand may decrease based on decelerating to a slower rate of speed, traveling along a decline (or along a flat section after an incline), and/or using alternative energy sources, such as regenerative braking or diesel-powered vehicles, to supplant at least some of the electrical energy needed to power the vehicle system.

In an embodiment, the energy usage plans are communicated to the network planner system 300 (shown in FIG. 3), and the processor 312 of the network planner system 300 interprets the energy usage plans and determines a projected energy demand 410 for the vehicle systems on the network. The projected energy demand 410 may be calculated by summating or totaling the energy demanded by each electric vehicle at each time, as described in the energy usage plans. The projected energy demand 410 is plotted on the graph 400 as well as an available amount 412 of electrical energy on the electrical power grid. The available amount 412 of electrical energy may be monitored by a grid monitoring device 306 of the network planner system 300. If the monitored available amount 412 of electrical energy on the grid remains relatively constant, the processor 312 of the network planner system 300 may reasonably predict that it will remain constant (e.g., at energy level $E_{10}$) in the future during the time period shown in graph 400. FIG. 4 is provided for illustration of a processing step taken by the processor 312 of the network planner system 300, but graph 400 or a similar graphic may optionally be displayed on a display for an operator of the network planner system 300 to view.

As shown in graph 400 of FIG. 4, the projected energy demand 410 exceeds the available amount 412 of electrical energy on the electrical power grid for the period from $t_2$ until after $t_4$, and again after $t_6$. If the electric vehicles on the network actually draw these levels of electrical energy at these times, there is a risk of overdrawing the grid, which may result in a power outage and/or vehicle stalling.

Figure 5:
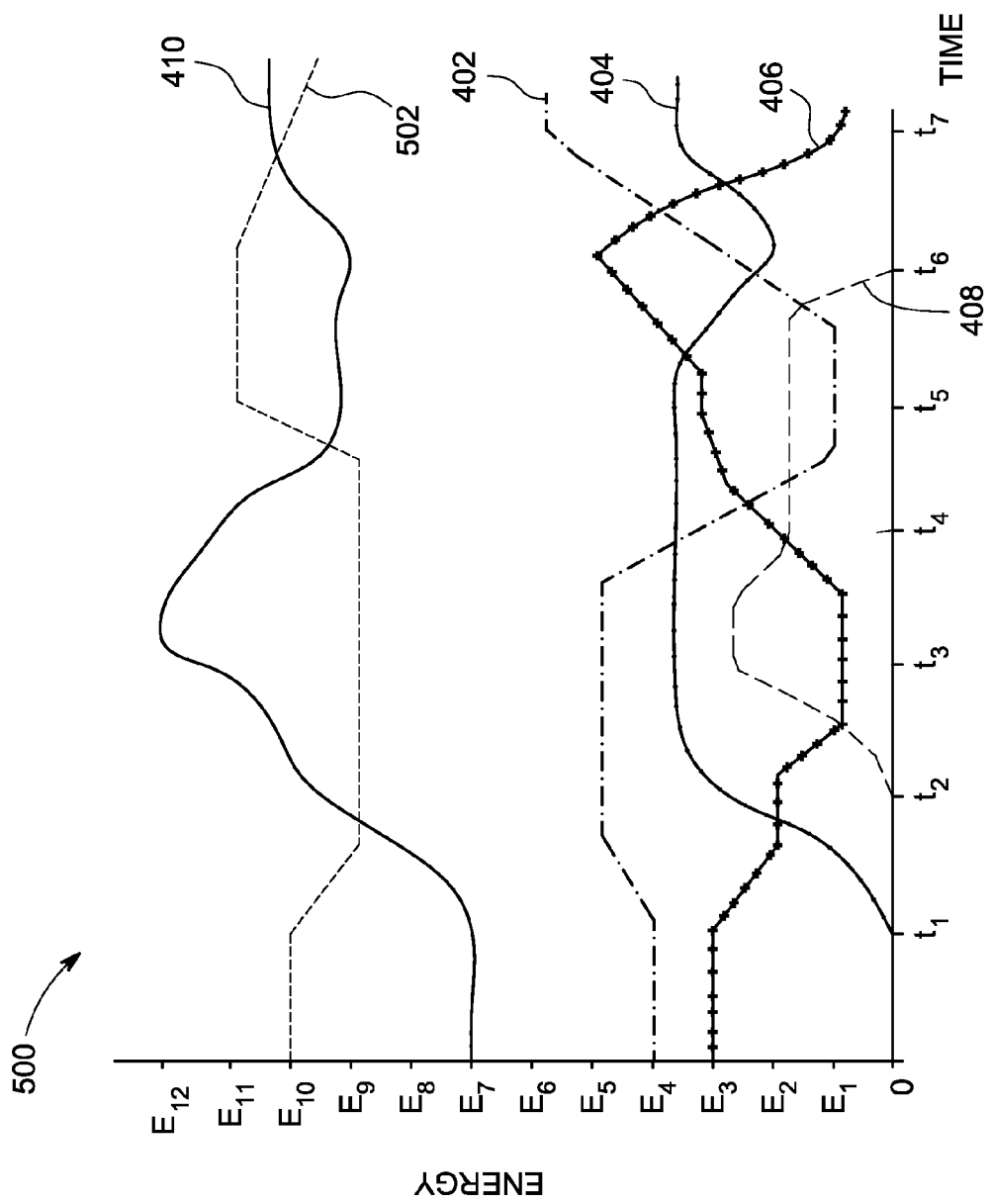
FIG. 5 is a graph showing the energy usage plans of FIG. 4 over time according to an embodiment.

FIG. 5 is a graph 500 showing the energy usage plans 402-408 of electric vehicles on a network over time according to an embodiment. Graph 500 shows the same energy usage plans 402-408 and projected energy usage 410 as graph 400. In an embodiment, the available amount 502 of electrical energy on the electrical power grid may not be a constant value, and may fluctuate over time. For example, the power source may not produce a constant and uniform supply of electrical energy to the grid. In another example, the electrical power grid may not be a closed network grid that only supplies electrical energy to electric vehicles on the network. Electrical energy on the grid may be used for powering other loads, such as domestic, commercial, industrial, and the like, in addition to powering the electric vehicles, and the other loads may demand more electrical energy at certain times than other times. For example, the available amount 502 of electrical energy on the grid may decrease at peak energy usage times of the day, then increase at non-peak energy usage times. Therefore, as shown in graph 500, the available amount 502 of electrical energy may fluctuate above and below energy level $E_{10}$ as time progresses. Therefore, as compared with graph 400 of FIG. 4, the projected energy use in graph 500 exceeds the available amount 502 of electrical energy sooner (e.g., prior to time $t_2$), but there is also more electrical energy available between times $t_5$ and $t_6$.

Figure 6:
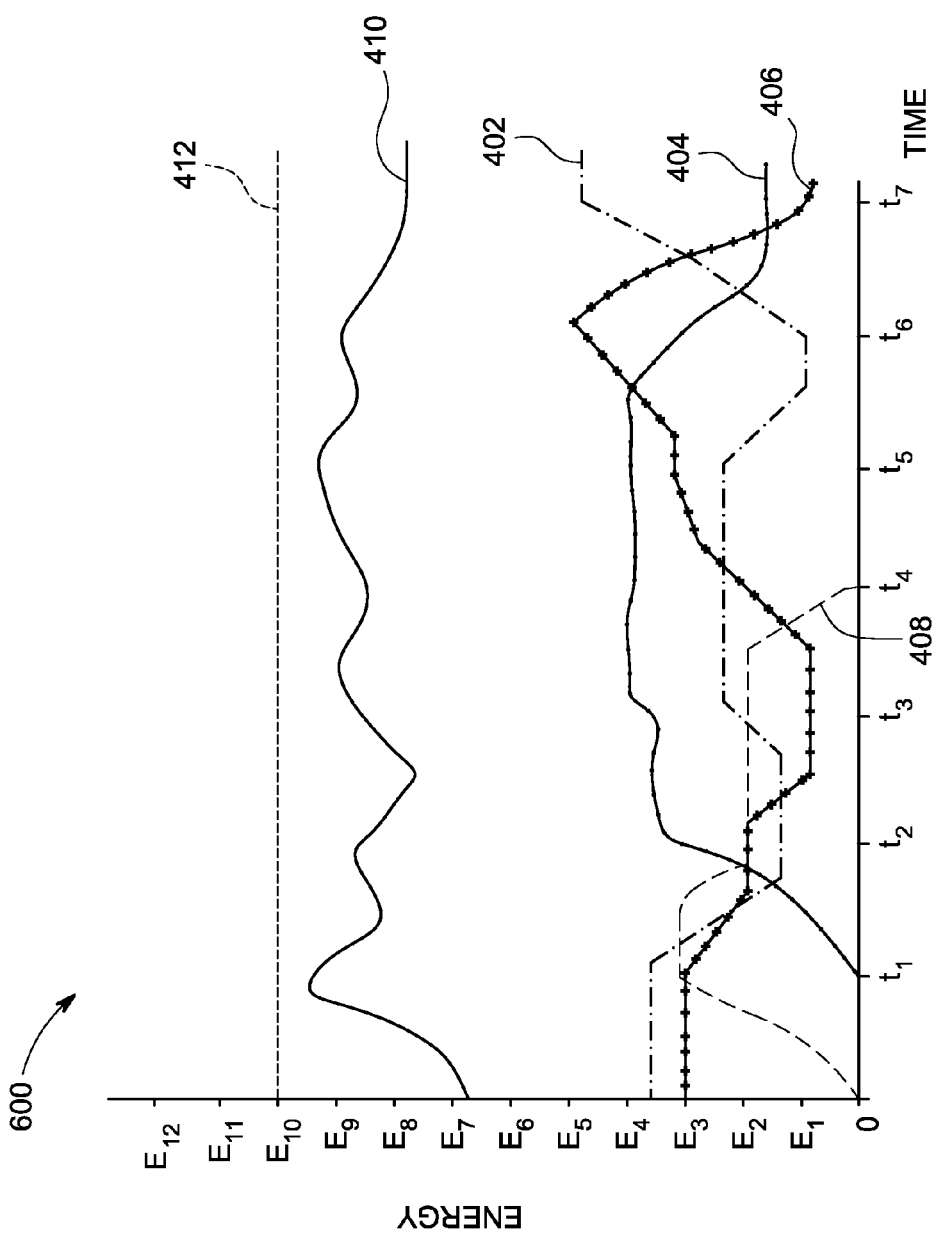
FIG. 6 is a graph showing the energy usage plans of FIG. 4 modified according to an embodiment.

FIG. 6 is a graph 600 showing the energy usage plans 402-408 of FIG. 4 modified according to an embodiment. Referring back to FIG. 4, the projected energy demand 410 exceeded the available electrical energy 412 on the electrical grid for the time period from $t_2$ until after $t_4$, and again after $t_6$, which may overdraw the grid capacity. In response, the processor 312 of the network planner system 300 (shown in FIG. 3) may be configured to modify the energy use plans of one or more electric vehicles traveling on the network to reduce the projected electrical energy demand to below the available electrical energy threshold 412. The processor 312 of the network planner system 300 may modify an energy usage plan for a proposed trip by changing at least one of route taken, time schedule for the trip, vehicle makeup, and movement characteristics. It is noted that the listed trip characteristics would typically be described in a trip plan. Therefore, the energy usage plan may be modified by modifying the trip plan in a way that will affect the energy usage during the trip.

For example, the energy usage plan 408 has been modified in FIG. 6 by changing the time schedule for the trip. More specifically, instead of the trip beginning at time $t_2$, the trip has been moved forward to start at $t_0$ instead, and will arrive at the destination earlier at $t_4$ instead of $t_6$. Besides from changing the departure time, the profile of the energy usage plan 408 has not been modified, meaning that the energy used during the trip remains the same. One reason for changing the start time of the trip represented by the plan 408 is to take advantage of the would-be unused available energy on the grid (e.g., the area under the curve 412 and over the curve 410) between times $t_0$ and $t_2$, as shown on graph 400 of FIG. 4, while decreasing the electrical energy that would be used around time $t_3$.

Energy usage plan 402 has also been modified in graph 600 of FIG. 6. The modified energy usage plan 402 in graph 600 demands less electrical energy from the grid from times $t_0$ to $t_4$ than the original plan 402 shown in graph 400 of FIG. 4. Reducing electrical energy demand may be accomplished in various ways. For example, between times $t_0$ and $t_1$, the electric vehicle may travel at a slower rate of speed according to the modified energy usage plan 402, using less energy. Alternatively, or in addition, the vehicle makeup may be modified such that the vehicle system employs less or more fuel efficient electric vehicles, the amount or type of cargo may be modified to reduce weight, and/or the vehicle configuration may be modified, such as by changing the spacing of electric vehicles relative to each other. At $t_1$, instead of increasing electrical energy demand in order to speed up or retain the same speed on an incline grade, the modified plan 402 may demand less electrical energy by relying on alternate power sources, for example. One possible alternate power source may be to activate one or more diesel propulsion-generating vehicles on the vehicle system to supply tractive force to supplant some or all of the energy demand by electric vehicles. Therefore, between $t_1$ and $t_3$, for example, the vehicle system may actually consume the same or more net energy to meet operating demands, although the electrical energy demand may reduce significantly due to the use of alternate energy sources. Another alternate energy source may be using stored electrical energy, such as electrical energy that is generated by regenerative braking and stored in electrical storage devices onboard the vehicle system. Using alternate energy sources to meet power demands may reduce the projected energy demand 410.

In graph 600 of FIG. 6, energy usage plan 404 has also been modified, although the change over the original plan 404 shown in graph 400 of FIG. 4 is not drastic. For example, the modified plan 404 projects greater electrical energy demand from time $t_3$ to time $t_6$ than the original plan 404, but demands less energy soon after time $t_6$. The total electrical energy demanded over the entire time period (represented on graph 600 by the area under the curve 404) may stay relatively constant using the modified plan 404, but by performing more work (e.g., demanding more energy) earlier in the trip, the vehicle system following the energy usage plan 404 will use a lot less energy after time $t_6$, which is one location on graph 400 that the energy demand 410 exceeds the available energy 412. One way to rearrange the work load along a trip may be to modify the route, such as by using a different route to get from the departure location to the destination. For example, the modified plan 404 may instruct the vehicle system to travel along a route that climbs along hills and/or mountains for a first half of the trip, but cruises generally downhill along the second half of the trip, demanding less electrical energy than a different route.

Energy usage plan 406 is not modified in graph 600 from the original plan 406 shown in graph 400 of FIG. 4. As stated, the processor 312 of the network planner system 300 (shown in FIG. 3) may modify one or more energy usage plans, but not necessarily all of the plans for all of the vehicles traveling in the network, as long as the modified plans yield a projected energy demand 410 that does not exceed the threshold representing the available energy 412 on the electrical grid. The updated projected energy demand 410, calculated by totaling the individual electrical energy demands at each time, is shown in graph 600. The updated projected energy demand 410 is below the available energy 412 for the duration of the time period. Therefore, if the vehicle systems traveling on the network implement the modified energy usage plans 402-408, there should not be a risk of overdrawing the electrical grid.

Figure 7:
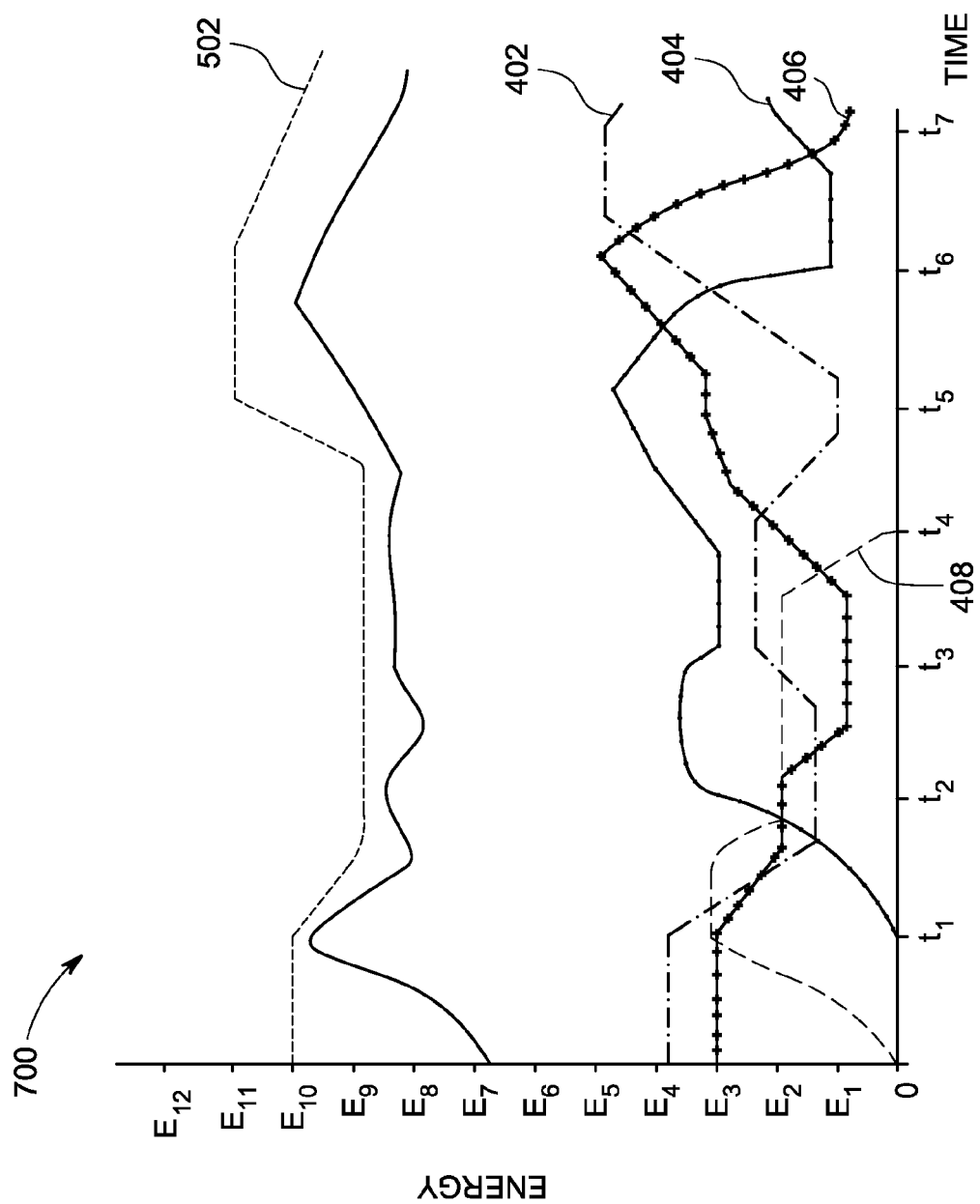
FIG. 7 is a graph showing the energy usage plans of FIG. 5 modified according to an embodiment.

FIG. 7 is a graph 700 showing the energy usage plans 402-408 of FIG. 5 modified according to an embodiment. Graph 700 shows modified energy usage plans 402-408, that were modified to prevent the projected energy demand 410 from exceeding the available amount 502 of electrical energy on the grid, which fluctuates over time. Since the available amount 502 of electrical energy fluctuates, the network planner system 300 (shown in FIG. 3) may be configured to monitor the grid capacity over time in order to calculate a reasonable projection for the available amount 502 over a future time period, such as the time period shown in FIG. 7. The available amount 502 of electrical energy on the grid capacity may fluctuate over time each day in a similar way as the day before, such as with peak energy usage times at specific times of the day. For example, the network planner system 300 may monitor current or actual grid capacity daily, and if the available amount 502 of energy fluctuates the same way each day within a certain error percentage, then the network planner system 300 may be able to make a reasonable projection of the available amount 502 over a future time period with an accuracy within the calculated error percentage. For example, if the monitored and recorded available amount 502 of electrical energy fluctuates the same way each day within 10 MW, then the network planner system 300 may be configured to prevent the projected energy demand of vehicle systems on the network from coming within 10 MW of the projected available amount 502 of electrical energy on the grid at any one time.

The projected energy demand 410 shown in graph 700 of FIG. 7 may be similar to the projected energy demand 410 shown in graph 600 of FIG. 6, as both are the result of modified energy usage plans. However, in graph 7, the energy usage plan 404 demands less electrical energy between times $t_3$ and $t_4$, and plan 402 demands less electrical energy between times $t_4$ and $t_5$ to prevent the projected energy demand 410 from exceeding the lowered available amount 502 of electrical energy during those times. In addition, between times $t_5$ and $t_7$, both plans 404 and 402 may include instructions to demand more electrical energy that the respective plans in graph 600 in order to take advantage of the extra available amount 502 of electrical energy on the grid during that time period. The increased area under the curve of the projected energy demand 410 between times $t_5$ and $t_7$ reflects the modified plans 404 and 402.

When the processor 312 of the network planner system 300 (shown in FIG. 3) modifies the energy usage plans, the modified energy usage plans and/or related trip plans may form a network energy consumption plan. The network energy consumption plan details electrical energy demand for the electric vehicles traveling in the network, and prevents the cumulative energy demand from exceeding the available amount of electrical energy which might overdraw the grid capacity. The processor 312 (shown in FIG. 3) may control the communication system 302 (shown in FIG. 3) to send the modified energy usage plans back to the respective electric vehicles, such as to the trip planner systems within the electric vehicles, for implementation. The modified energy usage plans may be communicated wirelessly between the communications system 302 on the network planner system 300 and the communications system 208 on the individual electric vehicles 200 (both shown in FIG. 2). The modified energy usage plans may include entire modified trip plans which detail trip instructions, such as routes, times, operating conditions, etc. Once the modified energy usage plans are received, the electric vehicles 200 may be configured to implement the trip instructions autonomously or through the intervention of an operator.

The above-described energy usage plans and modified energy usage plans detail specific operating characteristics that are to be followed on future trips based on projected energy availability and projected electrical energy demand from other electric vehicles traveling on the network. In some situations, the processor 312 of the network planner system 300 may not be able to modify each of the energy usage plans due to time constraints, for example. As an alternative, the processor 312 of the network planner system 300 may be configured to communicate an order to limit power consumption to the electric vehicles, without detailing a corresponding plan to follow. Such an order may, for example, communicate to each electric vehicle traveling on the network a maximum amount of electrical energy that may be demanded at one or more specific times. For example, the maximum amount may be allocated based on the monitored grid capacity and the number of electric vehicles on the network. The order, optionally including the allocated amount of electrical energy, may be received by trip planner systems on the electric vehicles, and the trip planner systems may autonomously compute a modified energy usage plan that reduces the electrical energy demanded during the trip and/or stays within the allocated energy demand limits. The network planner system 300 may send an order to limit power consumption, for example, when an energy usage plan has underestimated the actual electrical energy that will be demanded and requires a trip re-plan, when another vehicle system has been added to the network after other vehicle systems have started their trips, when updated data indicates that the electrical energy demand will exceed the grid capacity, and the like.

Figure 8:
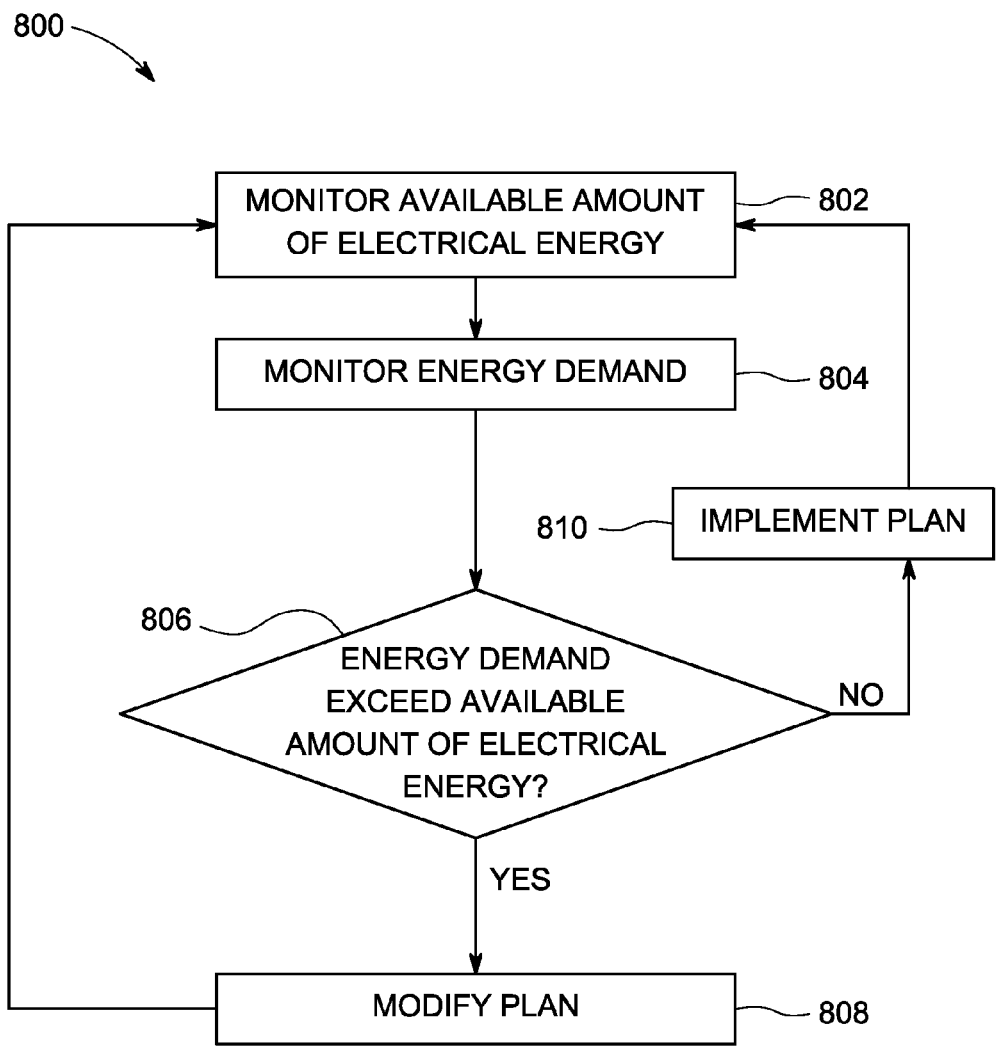
FIG. 8 is a flow diagram of one embodiment of a method for controlling electrical energy demand of vehicles on a network.

FIG. 8 is a flow diagram of one embodiment of a method 800 for controlling electrical energy demand of vehicles on a network. The method 800 may be performed at least partially by the network planner system 300 as shown in FIG. 3 and described herein. The method 800 is described in connection with the network 100 of routes shown in FIG. 1. At 802, the capacity of the electrical power grid 118 is monitored. The grid capacity may represent an available amount of electrical energy on the grid 118 that may be demanded by electric vehicles within vehicle systems 108 traveling on the network 100. The grid capacity may be monitored by measuring at least one of a voltage and a current on the grid 118. Optionally, the grid capacity may be monitored by communicating with a power supplier or another reference that tracks the grid capacity.

At 804, the energy demand of the vehicle systems 108 traveling on the grid 118 is monitored. The energy demand may be the total electrical energy that is demanded at one or more times by the vehicle systems 108 traveling on the grid 118. The electrical energy demand may be determined by summating or totaling the electrical energy demands of individual electric vehicles within the vehicle systems 108. For example, a projected electrical energy demand may be determined using individual energy usage plans that detail projected energy usage of individual vehicle systems 108 traveling on a trip in the network 100. In addition, an actual electrical energy demanded (e.g., drawn) may be determined by receiving real-time updates from vehicle systems detailing current electrical energy demand from the grid 118 on a vehicle-by-vehicle basis.

At 806, a determination is made as to whether the energy demand exceeds the grid capacity. Demanding an amount of electrical energy that exceeds the available amount of electrical energy on the grid 188 risks a power outage within the electrical power grid 118 or at least a section thereof, and/or stalling electric vehicles on the vehicle systems 108, causing delays that could affect the entire network of vehicle systems 108. The energy demand may be a projected energy demand at a future time or time period, and the grid capacity may be a projected grid capacity at the same time or time period. If the energy demand exceeds the grid capacity, then flow of the method 800 proceeds to 810.

At 810, one or more of the energy usage plans are modified to reduce the amount of electrical energy that is or will be demanded by the vehicle systems 108 traveling on the network 100 to a level within the available amount of electrical energy on the grid 118. The energy usage plans may be modified by one or more processors 312 in a network planner system 300 configured to control movements of the electric vehicles such that the electrical energy demand of the electric vehicles does not exceed the available amount of electrical energy on the electrical power grid. The network planner system 300 may issue a network energy consumption plan that modifies individual energy usage plans for at least some of the electric vehicles on the network 100. The modified energy usage plans may be communicated to the electric vehicles which implement the energy usage plans while traveling on trips. The modified energy usage plans may include modified routes, time schedules, vehicle makeups, operating instructions, and the like, which may be form part of a trip plan. Alternatively, or in addition to modifying the energy usage plans, the network energy consumption plan may allocate a maximum amount of electrical energy that may be demanded from the grid 118 by each electric vehicle on the network 100 at one time or at multiple specific times. The allocated maximum amounts may be communicated to the electric vehicles, and trip planner systems on the electric vehicles may modify the energy usage plans and/or trip plans on a vehicle-by-vehicle basis to stay within the allocated energy parameters. After modifying the plans to prevent the energy demand from exceeding the grid capacity, flow of the method 800 returns to 802 and the method 800 repeats.

Referring again back to 806, if the energy demand is determined to not exceed the grid capacity, then flow of the method 800 proceeds to 808. At 808, since there is no determined risk of exceeding the grid capacity, the energy plans are implemented. The energy plans may be energy usage plans determined by trip planner systems on individual electric vehicles and/or network energy consumption plans determined by the network planner system 300. Implementing the plans may include communicating with individual electric vehicles to proceed with the trip according to the most recent energy usage plan. For example, the implemented plan may be a modified energy usage plan that was modified by the network planner system 300 in a previous cycle of the method 800. After the plan is implemented, flow of the method 800 returns to 802 and the method 800 repeats.

One or more of the embodiments described herein may have as a technical effect the ability to manage the energy consumption of each vehicle system traveling on the network. Managing the energy consumption of each vehicle system may allow for an increased number of vehicle systems (e.g., vehicle capacity) and/or an increased size of vehicle systems on the same electrical energy supply. By managing the energy consumption, the vehicle capacity on the network may be increased without incurring the high cost of increasing the energy supply.

In an embodiment, a method (e.g., for controlling energy demand of plural propulsion-generating vehicles on a network) includes monitoring an available amount of electrical energy on an electrical power grid for powering one or more loads at one time. The available amount of electrical energy represents an amount of electrical energy that may be consumed at one time without exceeding a grid capacity. The method also includes monitoring an electrical energy demand of plural electric vehicles traveling on a network of routes that includes one or more conductive pathways extending along the routes for delivering the electrical energy from the electrical power grid to the electric vehicles. The method further includes controlling movements of the electric vehicles such that the electrical energy demand of the electric vehicles does not exceed the available amount of electrical energy on the electrical power grid.

In one aspect, monitoring the electrical energy demand includes monitoring energy usage plans of the respective electric vehicles. The energy usage plans detail the electrical energy demand along the routes traveled by the respective electric vehicles. Monitoring the electrical energy demand also includes determining a projected energy demand at a future time by totaling the electrical energy demand from the energy usage plans at the future time.

In one aspect, controlling movements of the electric vehicles includes modifying the energy usage plans based on at least one of a trip re-plan, an addition of another electric vehicle traveling on the network, or a projected energy demand that exceeds the available amount of electrical energy at a future time. Controlling movements of the electric vehicles also includes communicating the energy usage plans that are modified to the electric vehicles traveling on the network.

In one aspect, the energy usage plans provide instructions for at least one of route taken, time schedule, vehicle makeup, or movement characteristics to be implemented by the electric vehicles traveling on the network.

In one aspect, controlling movements of the electric vehicles includes allocating to the electric vehicles traveling on the network vehicle-specific maximum amounts of electrical energy that can be demanded from the electrical power grid by the respective electric vehicles.

In one aspect, the electric vehicles produce energy usage plans for the routes traveled by the respective electric vehicles based on the maximum amounts of electrical energy allocated to the respective electric vehicles.

In one aspect, monitoring the available amount of electrical energy includes monitoring changes in the available amount of electrical energy on the electrical power grid with respect to time.

In one aspect, monitoring the available amount of electrical energy includes monitoring the available amount of electrical energy on a section of the electrical power grid. The movements of the electric vehicles traveling on a sub-network of routes powered by the section of the electrical power grid are controlled such that the electrical energy demand does not exceed the available amount of electrical energy on the section.

In one aspect, controlling the movements of the electric vehicles includes creating a network energy consumption plan. The network energy consumption plan allocates energy consumption parameters to the electric vehicles traveling on the network to prevent the electric vehicles from exceeding the available amount of electrical energy on the electrical power grid.

In an embodiment, a network planner system is provided that includes a grid monitoring device and one or more processors. The grid monitoring device is configured to monitor an available amount of electrical energy on an electrical power grid for powering one or more loads at one time. The available amount of electrical energy represents an amount of electrical energy that may be consumed at one time without exceeding a grid capacity. The electrical power grid is configured to transmit electrical energy through one or more conductive pathways extending along a network of routes over which plural electric vehicles travel for delivery to the electric vehicles to power the electric vehicles. The one or more processors are configured to communicate with the grid monitoring device and the trip planner systems on the electric vehicles to control movements of the electric vehicles such that an electrical energy demand of the electric vehicles does not exceed the available amount of electrical energy on the electrical power grid.

In one aspect, the one or more processors are configured to create a network energy consumption plan that allocates vehicle-specific maximum amounts of electrical energy that can be demanded by the respective electric vehicles traveling on the network to prevent the electrical energy demand of the electric vehicles from exceeding the available amount of electrical energy on the electrical power grid.

In one aspect, the one or more processors are configured to create a network energy consumption plan that modifies at least one of route, time schedule, vehicle makeup, or movement characteristics of one or more of the electric vehicles traveling on the network to prevent the electrical energy demand of the electric vehicles from exceeding the available amount of electrical energy on the electrical power grid.

In one aspect, the movement characteristics include at least one of speed, acceleration, location, direction of travel, use of regenerative braking to supply electrical energy to the electrical power grid, or use of alternative energy sources other than electrical energy drawn from the electrical power grid for immediate consumption.

In one aspect, the one or more electric vehicles that receive modifications to the at least one of route, time schedule, vehicle makeup, or movement characteristics implement the modifications autonomously.

In one aspect, the one or more processors are configured to receive from the trip planner systems vehicle-specific energy usage plans, created by the trip planner systems, that detail the vehicle-specific energy demands along the routes traveled by the respective electric vehicles.

In one aspect, the one or more processors are configured to modify one or more of the energy usage plans based on at least one of a trip re-plan of one or more of the electric vehicles traveling on the network, an addition of another electric vehicle traveling on the network, or a projected energy demand of the electric vehicles at a future time that exceeds the available amount of electrical energy at the future time.

In one aspect, the one or more processors are configured to receive, from the trip planner systems on the electric vehicles, at least one of energy usage plans for proposed routes, current energy demands, current operating characteristics, or current route characteristics of respective electric vehicles.

In one aspect, the one or more processors instruct a first electric vehicle traveling on the network to ascend a first grade incline at a first time and a second electric vehicle traveling on the network to ascend a second grade incline at a second time that is different from the first time to distribute the energy demand on the electrical power grid over time.

In one aspect, an energy demand monitoring device monitors at least one of a current and projected energy demand from the electric vehicles traveling on the network.

In one aspect, at least one electric vehicle is coupled to one or more load vehicles to define a vehicle system that travels along a route in the network.

In one aspect, the one or more processors communicate wirelessly with the electric vehicles traveling on the network via a communication system.

In one aspect, the electric vehicles are rail vehicles, and the routes are tracks.

In one aspect, the available amount of electrical energy on the electrical power grid for powering one or more loads is less during peak energy usage times than during non-peak energy usage times.

In one aspect, the amount of electrical energy allocated to each electric vehicle traveling in the network by the one or more processors is not equal among all of the electric vehicles.

In an embodiment, a network planner system is provided that includes a grid monitoring device, an energy demand monitoring device, and one or more processors. The grid monitoring device is configured to monitor an available amount of electrical energy on an electrical power grid for powering one or more loads at one time. The available amount of electrical energy represents an amount of electrical energy that may be consumed at one time without exceeding a grid capacity. The energy demand monitoring device is configured to monitor an electrical energy demand of plural electric vehicles traveling on a network of routes that includes one or more conductive pathways extending along the routes for delivering the electrical energy from the electrical power grid to the electric vehicles to power the electric vehicles. The one or more processors are configured to control movements of the electric vehicles such that the electrical energy demand of the electric vehicles does not exceed the available amount of electrical energy on the electrical power grid. The one or more processors are configured to control the movements of the electric vehicles by at least one of modifying energy usage plans submitted by the electric vehicles traveling on the network or communicating to the electric vehicles vehicle-specific maximum amounts of electrical energy that can be demanded from the electrical power grid by the respective electric vehicles.

It is to be understood that the above description is intended to be illustrative, and not restrictive. For example, the above-described embodiments (and/or aspects thereof) may be used in combination with each other. In addition, many modifications may be made to adapt a particular situation or material to the teachings of the inventive subject matter without departing from its scope. While the dimensions and types of materials described herein are intended to define the parameters of the inventive subject matter, they are by no means limiting and are exemplary embodiments. Many other embodiments will be apparent to one of ordinary skill in the art upon reviewing the above description. The scope of the inventive subject matter should, therefore, be determined with reference to the appended claims, along with the full scope of equivalents to which such claims are entitled. In the appended claims, the terms "including" and "in which" are used as the plain-English equivalents of the respective terms "comprising" and "wherein." Moreover, in the following claims, the terms "first," "second," and "third," etc. are used merely as labels, and are not intended to impose numerical requirements on their objects. Further, the limitations of the following claims are not written in means-plus-function format and are not intended to be interpreted based on 35 U.S.C. §112, sixth paragraph, unless and until such claim limitations expressly use the phrase "means for" followed by a statement of function void of further structure.

This written description uses examples to disclose several embodiments of the inventive subject matter and also to enable a person of ordinary skill in the art to practice the embodiments of the inventive subject matter, including making and using any devices or systems and performing any incorporated methods. The patentable scope of the inventive subject matter is defined by the claims, and may include other examples that occur to those of ordinary skill in the art. Such other examples are intended to be within the scope of the claims if they have structural elements that do not differ from the literal language of the claims, or if they include equivalent structural elements with insubstantial differences from the literal languages of the claims. The various embodiments are not limited to the arrangements and instrumentality shown in the drawings.

Since certain changes may be made in the above-described systems and methods without departing from the spirit and scope of the inventive subject matter herein involved, it is intended that all of the subject matter of the above description or shown in the accompanying drawings shall be interpreted merely as examples illustrating the inventive concept herein and shall not be construed as limiting the inventive subject matter.

The invention claimed is:

1. A method comprising:
monitoring an available amount of electrical energy on an electrical power grid for powering one or more loads at one time, the available amount of electrical energy representing an amount of electrical energy that may be consumed at one time without exceeding a grid capacity;

monitoring an electrical energy demand of plural electric vehicles traveling on a network of routes that includes one or more conductive pathways extending along the routes for delivering the electrical energy from the electrical power grid to the electric vehicles; and controlling movements of the electric vehicles such that the electrical energy demand of the electric vehicles does not exceed the available amount of electrical energy on the electrical power grid;

wherein monitoring the electrical energy demand comprises monitoring energy usage plans of the respective electric vehicles, the energy usage plans detailing the electrical energy demand along the routes traveled by the respective electric vehicles, and determining a projected energy demand at a future time by totaling the electrical energy demand from the energy usage plans at the future time; and wherein controlling movements of the electric vehicles comprises modifying the energy usage plans based on at least one of a trip re-plan, an addition of another electric vehicle traveling on the network, or a projected energy demand that exceeds the available amount of electrical energy at a future time, and communicating the energy usage plans that are modified to the electric vehicles traveling on the network.

2. The method of claim 1, wherein the energy usage plans provide instructions for at least one of route taken, time schedule, vehicle makeup, or movement characteristics to be implemented by the electric vehicles traveling on the network.

3. The method of claim 1, wherein controlling movements of the electric vehicles comprises allocating to the electric vehicles traveling on the network vehicle-specific maximum amounts of electrical energy that can be demanded from the electrical power grid by the respective electric vehicles.

4. The method of claim 3, wherein the electric vehicles produce energy usage plans for the routes traveled by the respective electric vehicles based on the maximum amounts of electrical energy allocated to the respective electric vehicles.

5. The method of claim 1, wherein monitoring the available amount of electrical energy comprises monitoring changes in the available amount of electrical energy on the electrical power grid with respect to time.

6. The method of claim 1, wherein monitoring the available amount of electrical energy comprises monitoring the available amount of electrical energy on a section of the electrical power grid, and the movements of the electric vehicles traveling on a sub-network of routes powered by the section of the electrical power grid are controlled such that the electrical energy demand does not exceed the available amount of electrical energy on the section.

7. The method of claim 1, wherein controlling the movements of the electric vehicles comprises creating a network energy consumption plan, the network energy consumption plan allocating energy consumption parameters to the electric vehicles traveling on the network to prevent the electric vehicles from exceeding the available amount of electrical energy on the electrical power grid.

8. A network planner system comprising:
a grid monitoring device configured to monitor an available amount of electrical energy on an electrical power grid for powering one or more loads at one time, the available amount of electrical energy representing an amount of electrical energy that may be consumed at one time without exceeding a grid capacity, the electrical power grid configured to transmit electrical energy through one or more conductive pathways extending along a network of routes over which plural electric vehicles travel for delivery to the electric vehicles to power the electric vehicles, the electric vehicles having on-board trip planner systems; and one or more processors configured to communicate with the grid monitoring device and the trip planner systems on the electric vehicles to control movements of the electric vehicles such that an electrical energy demand of the electric vehicles does not exceed the available amount of electrical energy on the electrical power grid;

wherein the one or more processors are configured to receive from the trip planner systems vehicle-specific energy usage plans, created by the trip planner systems, that detail the vehicle-specific energy demands along the routes traveled by the respective electric vehicles.

9. The network planner system of claim 8, wherein the one or more processors are configured to create a network energy consumption plan that allocates vehicle-specific maximum amounts of electrical energy that can be demanded by the respective electric vehicles traveling on the network to prevent the electrical energy demand of the electric vehicles from exceeding the available amount of electrical energy on the electrical power grid.

10. The network planner system of claim 8, wherein the one or more processors are configured to create a network energy consumption plan that modifies at least one of route, time schedule, vehicle makeup, or movement characteristics of one or more of the electric vehicles traveling on the network to prevent the electrical energy demand of the electric vehicles from exceeding the available amount of electrical energy on the electrical power grid.

11. The network planner system of claim 10, wherein the movement characteristics comprise at least one of speed, acceleration, location, direction of travel, use of regenerative braking to supply electrical energy to the electrical power grid, or use of alternative energy sources other than electrical energy drawn from the electrical power grid for immediate consumption.

12. The network planner system of claim 10, wherein the one or more electric vehicles that receive modifications to the at least one of route, time schedule, vehicle makeup, or movement characteristics implement the modifications autonomously.

13. The network planner system of claim 8, wherein the one or more processors are configured to modify one or more of the energy usage plans based on at least one of a trip re-plan of one or more of the electric vehicles traveling on the network, an addition of another electric vehicle traveling on the network, or a projected energy demand of the electric vehicles at a future time that exceeds the available amount of electrical energy at the future time.

14. The network planner system of claim 8, wherein the one or more processors are configured to receive, from the trip planner systems on the electric vehicles, at least one of energy usage plans for proposed routes, current energy demands, current operating characteristics, or current route characteristics of respective electric vehicles.

15. The network planner system of claim 8, wherein the electric vehicles are rail vehicles, and the routes are tracks.

16. The network planner system of claim 8, wherein the available amount of electrical energy on the electrical power grid for powering one or more loads is less during peak energy usage times than during non-peak energy usage times.

17. A network planner system comprising:
a grid monitoring device configured to monitor an available amount of electrical energy on an electrical power grid for powering one or more loads at one time, the available amount of electrical energy representing an amount of electrical energy that may be consumed at one time without exceeding a grid capacity;

an energy demand monitoring device configured to monitor an electrical energy demand of plural electric vehicles traveling on a network of routes that includes one or more conductive pathways extending along the routes for delivering the electrical energy from the electrical power grid to the electric vehicles to power the electric vehicles; and one or more processors configured to control movements of the electric vehicles such that the electrical energy demand of the electric vehicles does not exceed the available amount of electrical energy on the electrical power grid, wherein the one or more processors are configured to control the movements of the electric vehicles by modifying energy usage plans submitted by the electric vehicles traveling on the network.

* * * * *